(12) United States Patent
Qiu

(10) Patent No.: US 12,538,902 B2
(45) Date of Patent: Feb. 3, 2026

(54) CHICKEN COOP DOOR

(71) Applicant: Xiamen Hedeman Electronic Technology Co., Ltd., Xiamen (CN)

(72) Inventor: Zhijie Qiu, Xiamen (CN)

(73) Assignee: Xiamen Hedeman Electronic Technology Co., Ltd., Xaimen (CN)

( * ) Notice: Subject to any disclaimer, the term of this patent is extended or adjusted under 35 U.S.C. 154(b) by 0 days.

(21) Appl. No.: 18/436,932

(22) Filed: Feb. 8, 2024

(65) Prior Publication Data

US 2025/0223858 A1    Jul. 10, 2025

(51) Int. Cl.
*A01K 31/02*    (2006.01)
*E05F 15/611*    (2015.01)

(52) U.S. Cl.
CPC ............ *A01K 31/02* (2013.01); *E05F 15/611* (2015.01); *E05Y 2201/484* (2013.01); *E05Y 2400/32* (2013.01); *E05Y 2900/132* (2013.01)

(58) Field of Classification Search
CPC ................................ A01K 31/02; A01K 31/10
See application file for complete search history.

(56) References Cited

U.S. PATENT DOCUMENTS

| | | | | |
|---|---|---|---|---|
| 2,174,781 A * | 10/1939 | Edwards | ............... | B61D 25/00 16/268 |
| 3,305,971 A * | 2/1967 | Golen | ...................... | E06B 3/50 49/81.1 |
| 3,426,732 A * | 2/1969 | Wade | ..................... | A01K 31/02 119/432 |
| 3,788,689 A * | 1/1974 | Lloyd | .................. | E05C 19/006 292/241 |
| 3,820,282 A * | 6/1974 | Kornylak | .................. | E05F 7/02 49/255 |
| 4,372,603 A * | 2/1983 | Stanczak | ................... | B60P 3/20 296/146.12 |
| 4,679,353 A * | 7/1987 | Langenbach | ............. | E05D 3/08 49/257 |
| 4,704,970 A * | 11/1987 | Sanderson | ................ | E05D 7/14 16/389 |
| 4,932,160 A * | 6/1990 | Sperko | .................... | E05D 15/28 49/277 |

(Continued)

FOREIGN PATENT DOCUMENTS

AU    2022201554 A1 *    9/2022
CN    112753606 A    5/2021
(Continued)

*Primary Examiner* — Catherine A Kelly

(57) ABSTRACT

A chicken coop door includes a door body, a connecting component, and a driving device. One end of the door body is connected to the pivot of the driving device through the connecting component, with the other end serving as the movable end. The rotation of the pivot propels the connecting component and door body to rotate. During the closing process, the connecting component guide the downward movement of the door body after rotation. The chicken coop door achieves rotational opening by placing connecting component, a driving device, and their pivot connection on the door body. This design prevents injuries to chickens during door closure and resolves the issue of the door being obstructed by chicken droppings during the rotational closing process, ensuring complete closure.

3 Claims, 5 Drawing Sheets

(56) References Cited

U.S. PATENT DOCUMENTS

| | | | | | |
|---|---|---|---|---|---|
| 5,056,262 | A | * | 10/1991 | Schweiss | E05C 19/006 |
| | | | | | 49/257 |
| 5,544,449 | A | * | 8/1996 | Amelio | B64C 1/1446 |
| | | | | | 49/261 |
| 5,570,925 | A | * | 11/1996 | Cohen | B62D 25/12 |
| | | | | | 49/257 |
| 5,953,860 | A | * | 9/1999 | Morgan | E06B 9/02 |
| | | | | | 49/257 |
| 7,404,363 | B2 | * | 7/2008 | Dunstan | E06B 3/40 |
| | | | | | 109/70 |
| 8,171,866 | B2 | * | 5/2012 | Dunstan | E05D 7/14 |
| | | | | | 109/70 |
| 10,837,222 | B2 | * | 11/2020 | Slabaugh | E06B 3/52 |
| 11,178,853 | B2 | * | 11/2021 | Koechner | A01K 31/02 |
| 11,533,891 | B1 | * | 12/2022 | Markič | E05F 15/78 |
| 2016/0186485 | A1 | * | 6/2016 | Taylor | E05F 15/611 |
| | | | | | 49/31 |

FOREIGN PATENT DOCUMENTS

| | | | | | |
|---|---|---|---|---|---|
| CN | 217546999 | U | | 10/2022 | |
| CN | 116034907 | A | * | 5/2023 | |
| CN | 117145357 | A | * | 12/2023 | |
| DE | 3832212 | A1 | * | 3/1990 | |
| EP | 0429813 | A1 | * | 6/1991 | |
| GB | 190321 | A | * | 12/1922 | |
| GB | 629222 | A | * | 9/1949 | |
| GB | 2594962 | A | * | 11/2021 | E05F 11/54 |
| KR | 20180134003 | A | * | 12/2018 | |

* cited by examiner

CHICKEN COOP DOOR

TECHNICAL FILED

The present disclosure relates to the technical field of chicken coop door, particularly focusing on a chicken coop door.

BACKGROUND

In order to protect chickens from disturbances by other animals during rest, chicken coops commonly employ electronic doors with scheduled opening and closing mechanisms for chicken access. Existing electronic chicken coop doors, such as an improved chicken coop door disclosed in Chinese Patent No. 217546999U, typically utilize a motor to raise and lower the door for opening and closing. However, during the opening/closing process, there is a high risk of pinching or trapping chickens if they are passing through or standing within the door. To address this issue, rotating chicken coop doors have been introduced, such as an adjustable space chicken coop disclosed in Chinese Patent Publication No. 112753606A. This design incorporates a rotating pivot on the chicken coop door for flipping the side door. Nevertheless, due to chickens defecating indiscriminately, chicken coop entrances often accumulate chicken droppings, leading to potential issues with the bottom of the door getting stuck in the droppings, preventing the door from closing completely.

SUMMARY

To address the aforementioned technical issues, the present disclosure provides a chicken coop door including a door body, a connecting component, and a driving device.

One end of the door body is connected to a pivot of the driving device through the connecting component, with the other end of the door body serving as a movable end; the pivot drives the connecting component and the door body to rotate. During a closing process, the door body is moved downwardly after rotation by means of the connecting component.

Preferably, the connecting component is a hinge. One leaf of the hinge is connected to the pivot, while the other leaf of the hinge is connected to the door body.

Preferably, a torsion spring is positioned on a core of the hinge. Two pressure feet of the torsion spring are located on the same side of the hinge.

Preferably, a guiding plate is situated above the door body.

Preferably, an installation plane of the movable end of the door body has a first latch. The first latch is configured to secure the movable end of the door body moving downward.

Preferably, the installation plane of the movable end of the door body has a second latch; the second latch is configured to secure the movable end of the door body moving towards the second latch from the side.

Preferably, a first end of the second latch is a hook portion, and the second end of the second latch is movably connected to the installation plane. When the movable end of the door body moves toward the hook portion, the movable end pushes the second latch to rotate along the second end, causing the hook portion to yield, and the movable end of the door body enters the hook portion.

Preferably, a side of the hook portion in contact with the movable end of the door body has a chamfer.

Preferably, the pivot has a dial equipped with a gear portion. One side of gear portion of the dial has a light source, and the other side of the gear portion has a first light sensor. The first light sensor is connected to a circuit board of the driving device.

The circuit board determines the rotational angle of the door body by counting the light emitted from the light source to the surface of the first light sensor.

Preferably, the chicken coop door further includes a second light sensor. The second light sensor is connected to the circuit board of the driving device. The second light sensor detects environmental changes to trigger the opening of the driving device.

The chicken coop door provided in the embodiments of the present disclosure achieves rotational door opening by incorporating a connecting component, a driving device, and their connection to the door body. This design mitigates the risk of trapping or injuring chickens during door closure. Simultaneously, the connecting component move the door body downward during closing, addressing the challenge of the door body getting obstructed by chicken droppings during the rotational closing process, ensuring complete closure.

DETAILED DESCRIPTION OF THE EMBODIMENTS

Figure 1:
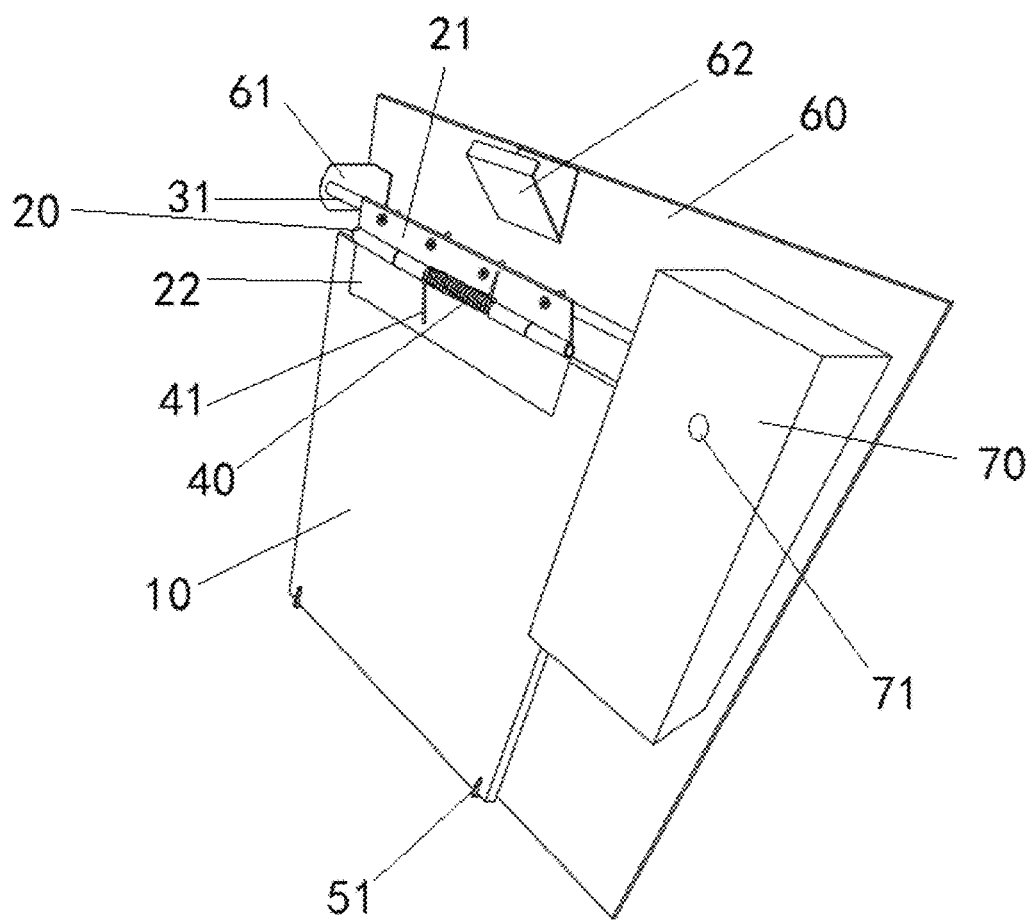
FIG. 1 shows a three-dimensional schematic diagram of the chicken coop door according to embodiments of the present disclosure.

To facilitate a clear understanding of the technical means, creative features, achievements, and effects achieved by the present disclosure, specific embodiments are further described below. It should be noted that the following embodiments are merely preferred embodiments of the present disclosure, not exhaustive. Based on the embodiments disclosed, other embodiments obtained by those skilled in the art without creative work are within the scope of protection of the present disclosure. Unless otherwise specified, the experimental methods in the following embodiments are conventional, and materials, reagents, etc., used in the following embodiments can be obtained commercially unless otherwise specified.

In the description of the present disclosure, it needs to be clarified that terms such as "up," "down," "inner," "outer," "front end," "rear end," "both ends," "one end," "the other end," etc., indicating orientation or positional relationships, are based on the orientation or positional relationships shown in the drawings. They are used for the convenience of describing the present disclosure and simplifying the description, and do not indicate or imply that the device or element referred to must have a specific orientation or be constructed and operated in a specific orientation. Therefore, they should not be understood as limiting the present disclosure. In addition, terms such as "first" and "second" are used for descriptive purposes only and should not be understood to indicate or imply relative importance.

In the description of the present disclosure, it needs to be clarified that, unless otherwise explicitly specified and limited, terms such as "installation," "provided with," "connected," etc., should be broadly interpreted. For example, "connected" can be a fixed connection or a detachable connection, or an integral connection; it can be a mechanical connection or an electrical connection; it can be directly connected or indirectly connected through an intermediate medium; it can be an internal connection of two components. For those skilled in the art, the specific meanings of these terms in the present disclosure can be understood according to the specific situation.

In an embodiment of the present disclosure, a chicken coop door is provided, comprising a door body (10), a connecting component (20), and a driving device (30).

One end of the door body (10) is connected to the pivot (31) of the driving device (30) through the connecting component (20), with the other end of the door body (10) serving as the movable end. The pivot (31) drives the connecting component (20) and the door body (10) to rotate. The connecting component (20) move the door body (10) upward before rotation or downward after rotation.

Figure 2:
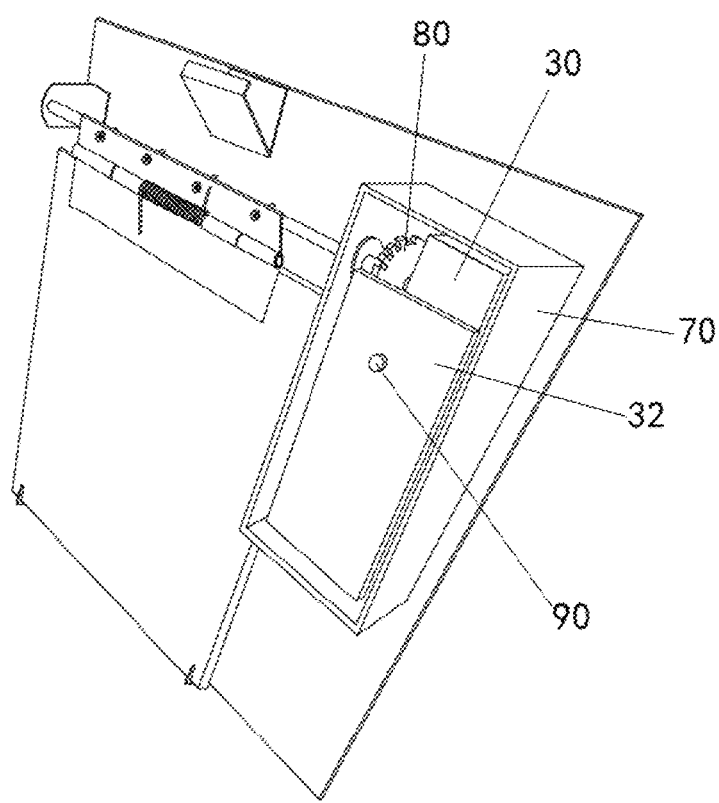
FIG. 2 shows the schematic diagram of the protective shell in an open position according to embodiments of the present disclosure.

In a specific embodiment, as shown in FIGS. 1 and 2, the chicken coop door includes a door body (10), a connecting component (20), and a driving device (30). One end of the door body (10) is connected to the pivot (31) of the driving device (30) through the connecting component (20), with the other end of the door body (10) serving as the movable end. The driving device (30) is a motor. The driving device (30) drives the pivot (31) to rotate. The pivot (31) drives the connecting component (20) and the door body (10) to rotate along the pivot (31). The connecting component (20) moves the door body (10) upward before rotation or downward after rotation. In this embodiment, the driving device can be started by manually connecting it to the power supply using a button or through the circuit board (32) controlling the control circuit. The rotation of the motor is easily achieved by the control circuit, and the specific details are not elaborated here.

Figure 3:
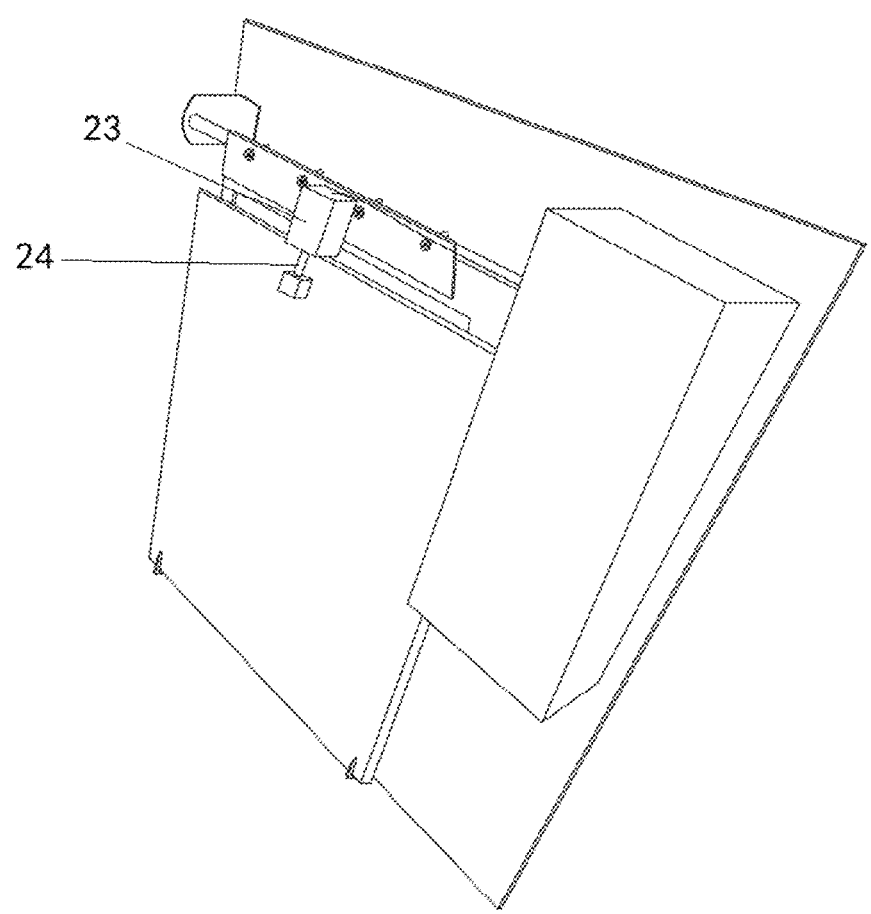
FIG. 3 shows the schematic diagram of the installation of the lead screw motor according to embodiments of the present disclosure.

Preferably, in this embodiment, the connecting component (20) can be a lead screw motor, hinges, or similar structures. As shown in FIG. 3, when the connecting component (20) is a lead screw motor, the motor portion (23) of the lead screw motor is electrically connected to the circuit board (32). The end of the telescopic rod (24) of the lead screw motor is fixedly connected to the door body (10), and the motor portion (23) of the lead screw motor is fixedly connected to the pivot (31). When closing the door, the door body (10) first rotates with the pivot (31), and then the extension of the telescopic rod (24) of the lead screw motor drives the door body (10) downward to achieve closing, thereby avoiding the problem of the door body (10) pushing chicken droppings to the entrance of the chicken coop during the rotational closing process, causing obstruction and incomplete closure.

The chicken coop door provided in the embodiment of the present disclosure achieves rotational door opening by incorporating connecting component, a driving device, and their connection to the door body. This design mitigates the risk of trapping or injuring chickens during door closure. Simultaneously, the connecting component moves the door body downward during closing, addressing the challenge of the door body getting obstructed by chicken droppings during the rotational closing process, ensuring complete closure.

Furthermore, with reference to FIGS. 1 and 2, the connecting component (20) are hinges; one leaf of the hinge (20) is connected to the pivot (31), while the other leaf is connected to the door body (10).

The rotation of the pivot (31) drives the hinge to rotate. When the hinge rotates with the pivot (31), it drives the door body (10) to move upward before rotating or downward after rotating.

In a specific embodiment, as shown in FIGS. 1 and 2, the connecting component (20) are hinges. The first leaf (21) of the hinge (20) is longitudinally connected to the pivot (31) by bolts, and the second leaf (22) is connected to the door body (10) by welding or bolts. The rotation of the pivot (31) drives the hinge to rotate. When the hinge rotates with the pivot (31), it can drive the door body (10) to move upward before rotating or downward after rotating.

Figure 4:
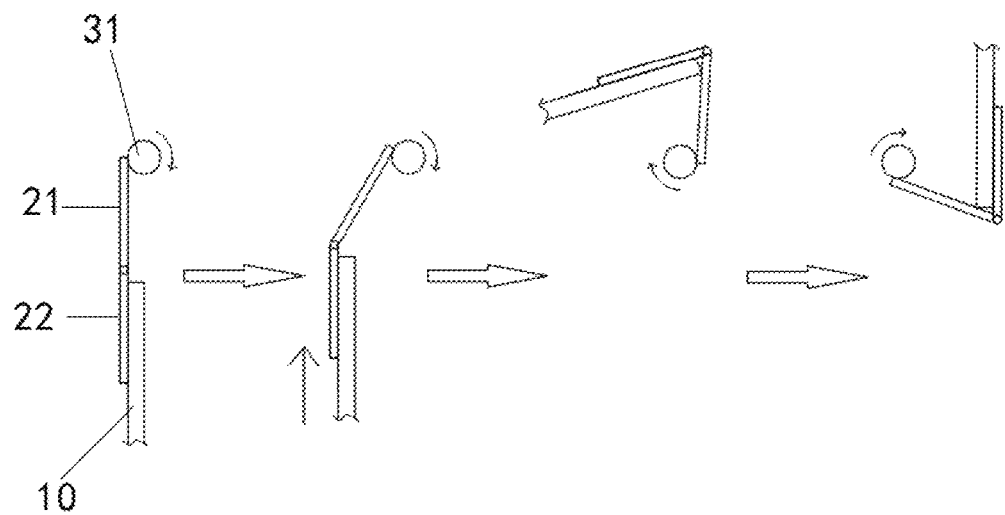
FIG. 4 shows the process diagram of the hinge's movement under the drive of the pivot according to embodiments of the present disclosure.

When opening the door, as shown in FIG. 4, the door body (10) is in a vertically closed state, and the hinge is in a vertically open state. When the driving device (30) rotates the pivot (31), since the pivot (31) is connected to the door body (10) through the hinge, the door body (10) moves upward first and then flips upward with the pivot (10), achieving door opening.

When closing the door, the door body is in the above-mentioned open state. When the driving device (30) rotates the pivot (31) in the opposite direction, the door body (10) rotates downward with the pivot (31) to a certain angle, and then, under the influence of gravity, the door body (10) flips downward. The pivot (31) continues to drive the hinge to rotate, and the door body (10), driven by the hinge, continues to move downward to the closed state.

The chicken coop door provided in the embodiment of the present disclosure, through hinge connection of the pivot and the door body, has a simple structure. It achieves the purpose of the door body moving downward after rotation during door closure without the need for an additional motor. The structure is simple, practical, and cost-effective.

Preferably, in the embodiment of the present disclosure, when installing the door body, the end of the pivot (31) can be fixed on the installation plane (60) using a fixing plate (61). The driving device is fixed on the installation plane (60). The fixing plate (61) sets the pivot (31) at a distance from the surface of the installation plane (60), providing sufficient space for the hinge to rotate.

Furthermore, the core of the hinge is equipped with a torsion spring (40). The torsion spring (40) has pressure feet (41) at both ends. Both pressure feet (41) are located on the same side of the hinge. When the door body (10) is obstructed during closure, the torsion spring (40), driven by the pivot (31), exerts a pushing force on the door body (10).

In a specific embodiment, as shown in FIGS. 1 and 2, the core of the hinge is equipped with a torsion spring (40). The torsion spring (40) has pressure feet (41) at both ends. Both pressure feet (41) are located on the same side of the hinge and abut against the two leaves of the hinge. The included angle between the two pressure feet (41) is less than 90 degrees. When the door body (10) is obstructed during closure (e.g., when a chicken is standing in the doorway), the torsion spring (40), driven by the pivot (31), exerts a pushing force on the door body (10).

The chicken coop door provided in the embodiment of the present disclosure, through the structural design combining the torsion spring with the hinge, applies pushing force on the door body when a chicken is passing through or standing in the doorway. This helps to drive the chicken into the chicken coop, avoiding abnormal door closure issues.

Furthermore, a guiding plate (62) is located above the door body (10).

In a specific embodiment, as shown in FIG. 1, the installation plane (60) above the door body (10) is equipped with a guiding plate (62). The guiding plate (62) is inclined upward. When the door body (10) begins to close from the vertically open state, the door body (10), driven by the pivot (31) and the hinge (20), first moves upward. The surface of the door body (10) passes over the guiding plate (62), and the inclined guiding plate (62) changes the center of gravity of the door body (10), assisting the door body (10) in transitioning from a vertical to a horizontal direction.

The chicken coop door provided in the embodiment of the present disclosure, through the design of the guiding plate, can avoid abnormal issues during door closure.

Furthermore, the installation plane (60) at the movable end of the door body (10) is equipped with a first latch (51); the first latch (51) is configured to fix the movable end of the door body (10) moving from top to bottom.

Figure 5:
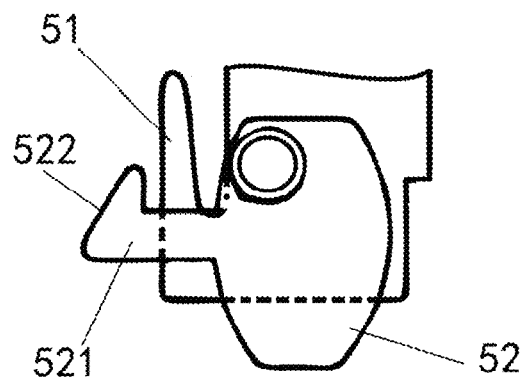
FIG. 5 shows the schematic diagram of the first latch and the second latch according to embodiments of the present disclosure.

In a specific embodiment, as shown in FIGS. 1 and 5, the installation plane (60) at the movable end of the door body (10) is equipped with a first latch (51). The first latch (51) is L-shaped. During door closure, the door body (10) moves vertically downward, driven by the pivot (31) and the connecting component (20), and enters the first latch (51), thereby fixing the movable end of the door body (10).

When the movable end of the door body is not fixed, chickens inside the coop may sometimes push the door open from the inside. The chicken coop door provided in the embodiment of the present disclosure, by setting the first latch at the bottom of the door, solves the problem of the door being opened from the inside when in the closed state.

Furthermore, the installation plane (60) at the movable end of the door body (10) is equipped with a second latch (52). The second latch (52) is configured to fix the movable end of the door body (10) moving from the side.

In a specific embodiment, as shown in FIG. 5, the installation plane (60) at the movable end of the door body (10) is equipped with a second latch (52). The second latch (52) is configured to fix the movable end of the door body (10) moving from the side. When chickens are standing or passing through the coop door, the door body cannot vertically enter the first latch. In this embodiment, the second latch is configured to fix the movable end of the door body when abnormal closure occurs.

Furthermore, one end of the second latch (52) is a hook part (521), and the other end is movably connected to the installation plane (60). When the movable end of the door body (10) moves toward the hook part (521), it can push the second latch (52) to rotate along its movable connection part, causing the hook part (521) to yield, and the movable end of the door body (10) enters the hook part (521).

Figure 6:
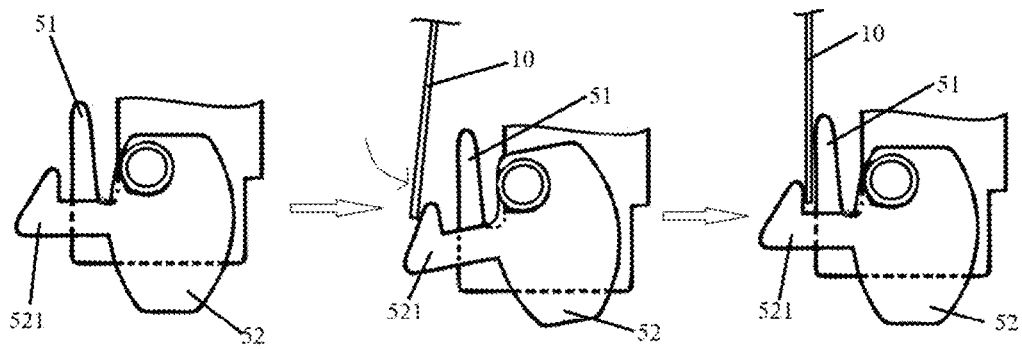
FIG. 6 shows the schematic diagram of the movable end of the door body entering the second latch under abnormal conditions.

In a specific embodiment, as shown in FIGS. 5 and 6, one end of the second latch (52) is a hook part (521), and the other end is movably connected to the protruding side wall at the bottom of the installation plane (60). When the movable end of the door body (10) moves toward the hook part (521), as shown in FIG. 6, due to gravity or the combined action of the torsion spring (40), the pivot (31), the second latch (52) is pushed to rotate along its movable connection part, causing the hook part (521) to yield, and the movable end of the door body (10) enters the hook part (521). In this embodiment, when the second latch (52) is combined with the hinge and the torsion spring (40), during door closure, the torsion spring (40), under the action of the driving device (30), applies pushing force to the door body (10), pushing it into the second latch (52), thereby avoiding the problem of the door body (10) being unable to engage with the second latch (52).

Furthermore, the hook part (521) is chamfered on one side in contact with the movable end of the door body (10).

In a specific embodiment, as shown in FIG. 5, the hook part (521) is chamfered on one side in contact with the movable end of the door body (10). The chamfered structure of the chamfer (522) facilitates the entry of the door body (10) into the second hook part (52).

Furthermore, the pivot (31) is equipped with a dial (80) with a gear portion. one side of the gear portion of the dial (80) is equipped with a light source (81), and the other side is equipped with a first light sensor (82); the first light sensor (82) is connected to the circuit board (32) of the driving device (30).

The circuit board (32) determines the rotation angle of the door body (10) based on the light emitted by the light source (81) and received by the first light sensor (82).

Figure 7:
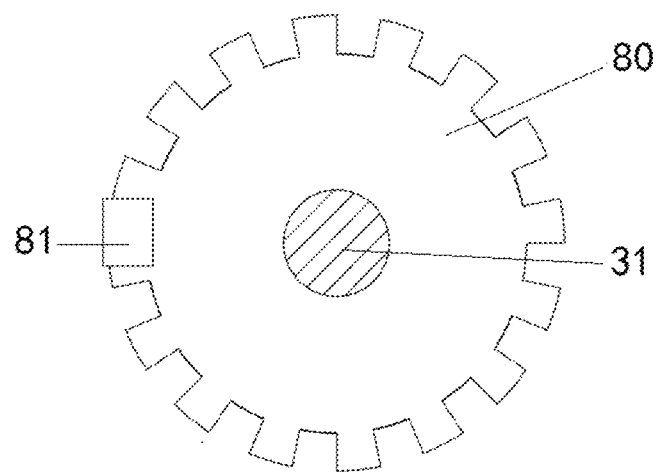
FIG. 7 shows a side view of the dial according to embodiments of the present disclosure.
Figure 8:
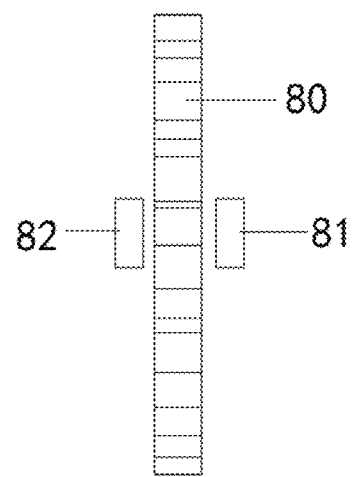
FIG. 8 shows the schematic diagram of the positions of the dial, light source, and the first light sensor according to embodiments of the present disclosure. In the drawings: 10, door body; 20, connecting component; 21, first leaf of the hinge; 22, second leaf of the hinge; 23, motor portion; 24, telescopic rod; 30, driving device; 31, pivot; 32, circuit board; 40, torsion spring; 41, pressure feet; 51, first latch; 52, second latch; 60, installation plane; 61, fixing plate; 62, guiding plate; 521, hook portion; 522, chamfer; 70, protective shell; 71, through-hole; 80, dial; 81, light source; 82, first light sensor; 90, second light sensor.

In a specific embodiment, as shown in FIGS. 2, 7, and 8, the pivot (31) is equipped with a dial (80) with gears; one side of the gear portion of the dial (80) is equipped with a light source (81), and the other side is equipped with a first light sensor (82); the first light sensor (82) is electrically connected to the circuit board (32) of the driving device (30).

The light emitted by the light source (81) is received and detected by the first light sensor (82). There is a dial (80) with gears between the light source (81) and the first light sensor (82). When the dial (80) rotates under the drive of the pivot (30), the light emitted by the light source (81) is intermittently blocked by the gear portion of the dial (80). The light passing through the gap between the gear teeth is detected by the first light sensor (82); during the rotation of the pivot (30), the circuit board (32) counts the light received on the surface of the first light sensor (82), thereby determining the number of rotations of the pivot (30) and the rotation angle of the door body (10). Users can set the rotation angle of the door body (10) by setting the number of codes on the dial (80). When the door body is installed at a height insufficient to accommodate the vertical open state (e.g., 180°), the user can reduce the opening angle of the door body (e.g., 90°) by setting the number of codes, solving the problem of insufficient height of the installation plane. In this embodiment, the circuit for counting the light received by the first light sensor and determining the number of rotations of the pivot through the dial is a technical means that is easily implementable by those skilled in the art and will not be elaborated here.

Furthermore, it also includes a second light sensor (90); the second light sensor (90) is connected to the circuit board

(32) of the driving device (30); the second light sensor (90) detects changes in the environment to trigger the driving device (30) to open.

In a specific embodiment, as shown in FIGS. 1 and 2, it also includes a second light sensor (90); the second light sensor (90) is electrically connected to the circuit board (32) of the driving device (30); the second light sensor (90) detects changes in the brightness of the environment, and when the second light sensor (90) detects that the daylight is bright, the circuit board (32) controls the driving device (30) to start, thereby opening the door body (10); when the second light sensor (90) detects that the night light is dim, the circuit board (32) controls the driving device (30) to start, thereby closing the door body (10). In this embodiment, the design of the second light sensor (90) combined with the driving device can open or close the door body according to day and night, making it convenient for users.

Preferably, the driving device (30), dial (80), light source (81), first light sensor (82), second light sensor (90), and circuit board (32) are all located inside the protective shell (70); the pivot (31) of the driving device (30) passes through the protective shell (70); the protective shell (70) is provided with a through hole (71) where the second light sensor (90) is located. In this embodiment, the design of the protective shell (70) can play a role in waterproofing and avoiding mechanical collision of internal components.

While embodiments of the present disclosure have been illustrated and described, it will be apparent to those skilled in the art that various changes, modifications, substitutions, and variations can be made to these embodiments without departing from the principles and spirit of the present disclosure. The scope of the present disclosure is defined by the appended claims and their equivalents.

What is claimed is:

1. A chicken coop door, comprising a door body, a connecting component, and a driving device; wherein one end of the door body is connected to a pivot of the driving device through the connecting component, with the other end of the door body serving as a movable end; the pivot drives the connecting component and the door body to rotate; during a closing process, the door body is moved downwardly after rotation by means of the connecting component;

the connecting component is a hinge; one leaf of the hinge is connected to the pivot, while the other leaf of the hinge is connected to the door body;

a torsion spring is positioned on a core of the hinge; two pressure feet of the torsion spring are located on the same side of the hinge;

a guiding plate is situated on an upper portion of the door body; the guiding plate is disposed in an upwardly inclined orientation such that, upon initiation of a closing movement of the door body from a vertically open position, the door body moves upward and passes over the guiding plate, an inclined surface of the guiding plate altering the center of gravity of the door body to assist in transitioning the door body from a vertical to a horizontal orientation.

2. The chicken coop door according to claim 1, wherein the pivot has a dial equipped with a gear portion; one side of gear portion of the dial has a light source, and the other side of the gear portion has a first light sensor; the first light sensor is connected to a circuit board of the driving device;

wherein the circuit board determines the rotational angle of the door body by counting the light emitted from the light source to the surface of the first light sensor.

3. The chicken coop door according to claim 2, wherein the chicken coop door further includes a second light sensor; the second light sensor is connected to the circuit board of the driving device; the second light sensor detects environmental changes to trigger the driving device to open the door body.

* * * * *